US012439477B2

(12) United States Patent
Khan et al.

(10) Patent No.: US 12,439,477 B2
(45) Date of Patent: Oct. 7, 2025

(54) SYSTEM AND METHOD FOR COMMUNICATING EMERGENCY INFORMATION IN AN EMERGENCY CALL

(71) Applicant: VERIZON PATENT AND LICENSING INC., Basking Ridge, NJ (US)

(72) Inventors: Kashif Khan, Keller, TX (US); Danysel Barthelme, Frisco, TX (US); Ronald E. Collier, II, Arlington, TX (US); Ertao Li, Plano, TX (US); Steve L. Padilla, Lewisville, TX (US); Gaurav Patel, Mckinney, TX (US); Shawn R. Pugh, Easton, PA (US); Shujaat Ali Siddique, Hillsborough, NJ (US); Daniel L. Walker, Wall, NJ (US); John Cao Vinh Nguyen, Trophy Club, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 372 days.

(21) Appl. No.: 18/180,320

(22) Filed: Mar. 8, 2023

(65) Prior Publication Data
US 2024/0306251 A1    Sep. 12, 2024

(51) Int. Cl.
*H04W 76/50* (2018.01)
*H04L 65/1045* (2022.01)

(52) U.S. Cl.
CPC ......... *H04W 76/50* (2018.02); *H04L 65/1045* (2022.05)

(58) Field of Classification Search
CPC ............ H04L 65/1016; H04L 65/1104; H04L 65/1069; H04L 65/1045; H04L 2101/385; H04L 67/14; H04W 76/50; H04W 80/10; H04W 4/90; H04W 76/10; H04W 76/11
See application file for complete search history.

(56) References Cited

U.S. PATENT DOCUMENTS

| | | | |
|---|---|---|---|
| 2009/0067584 A1* | 3/2009 | Waters | H04W 4/90 379/45 |
| 2011/0026440 A1* | 2/2011 | Dunn | H04M 3/5116 370/259 |
| 2011/0058658 A1* | 3/2011 | Li | H04L 65/1016 370/352 |
| 2012/0134345 A1* | 5/2012 | Tamhankar | H04W 88/06 370/328 |
| 2016/0227589 A1* | 8/2016 | Marshall | H04W 4/029 |
| 2018/0352094 A1* | 12/2018 | Ginter | H04L 65/1046 |
| 2020/0098246 A1* | 3/2020 | Stafford | H04M 1/72424 |
| 2023/0156865 A1* | 5/2023 | Cataquis | H04W 4/021 455/445 |
| 2024/0022875 A1* | 1/2024 | Alasti | H04W 4/02 |

* cited by examiner

*Primary Examiner* — Charles N Appiah

(57) ABSTRACT

In the various embodiments, systems and methods are disclosed for providing unique service and location codes from a user of a mobile device to a Public Safety Answering Point (PSAP) operator at the beginning of an emergency call. In some embodiments, the unique location codes can be utilized in routing the of the emergency call to the appropriate PSAP. In the embodiments, the unique codes can be received as part of an SIP INVITE message including a modified P-Access-Network-Info (PANI) header forwarded from a Proxy-Call Session Control Function (P-CSCF) to an Emergency Call Session Control Function (E-CSCF).

20 Claims, 4 Drawing Sheets

SYSTEM AND METHOD FOR COMMUNICATING EMERGENCY INFORMATION IN AN EMERGENCY CALL

BACKGROUND

Current emergency response services rely on wireless network infrastructure or built-in device localization technologies such as Global Positioning Systems (GPS) to determine the approximate location of a device initiating an emergency call. The reported approximate locations are then used to route the call to the appropriate Public Safety Answering Point (PSAP). PSAP operators also use the reported approximate locations to direct first responders to the scene of the emergency. Both localization techniques present inherent limitations that hinder the response time and efficacy of the emergency services.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION

Figure 1:
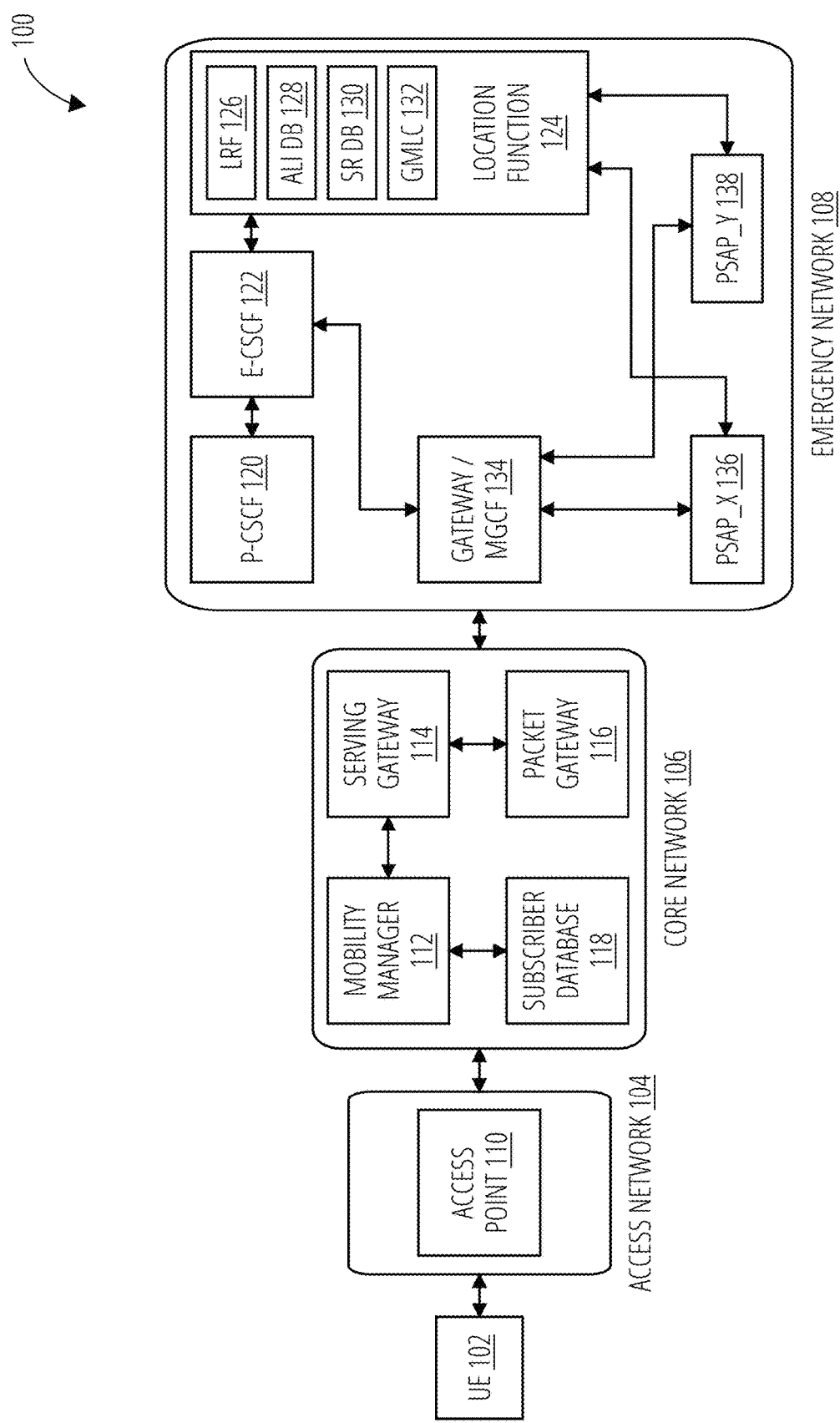
FIG. 1 is a block diagram illustrating an example environment within which the systems and methods disclosed herein could be implemented according to an embodiment.

In a typical emergency service network (ESN) an emergency call from a mobile device communicatively coupled to a mobile network is routed from a base station of the mobile network through a core network to the ESN. Then, based on location information corresponding to the mobile device the call is routed to the appropriate PSAP (Public Safety Answering Point). A PSAP is a call center or dispatch facility that is responsible for answering emergency telephone calls, messages, or other communications and dispatching the appropriate emergency response personnel and equipment. As used herein an emergency call can include voice, messages, multimedia, or any other type of data.

In some implementations, the appropriate PSAP is determined based on the location of the base station (e.g., cell or sector ID) communicatively coupled with the mobile device at the time the emergency call is made. However, in some instances, due to the emergency circumstances, environmental conditions or technical limitations, the mobile device may not be connected to the nearest base station and instead may be connected to a base station with a corresponding PSAP in another jurisdiction. For example, an emergency call may be originated by someone in a different location from the scene of the emergency or environmental factors may force a connection to be established with a base station in another jurisdiction. In these scenarios, the emergency call will likely be misrouted to a PSAP other than the PSAP covering the scene of the emergency. In each misrouting instance, the calls have to be transferred to the correct PSAP. This process consumes additional time and resources and ultimately hinders first responders in reaching the scene of the emergency in a timely manner.

In some implementations, after the connection has been established to the PSAP (whether correct or incorrect), the responding PSAP can determine the location of the mobile device based on geographic coordinates (e.g., latitude and longitude) provided by the mobile device upon request or from a separate service. However, current technologies can only provide a rough estimate of the location of the mobile device. For example, in emergencies in downtown areas with many cell sites, large school or office buildings, or large apartment complexes, geographic coordinates are not sufficiently accurate to guide first responders to the right building or floor where the emergency is occurring.

Moreover, current emergency response systems do not allow for quick and efficient communication to the PSAP of the service requested (e.g., police, firefighters, paramedics) or the nature of the emergency. For example, during a typical emergency call, a user of the mobile device can only verbally communicate the location and/or nature of the emergency to an operator after the call has been established. The added interaction between the user and the operator can introduce unnecessary delays to the response time of the first responders. In some instances, the user may not be able to communicate with the operator at all (e.g., during a heart attack or other health emergency). In those instances, the operator is only able to direct first responders to a general area, leading to wasted time while the first responders search for the specific location of the emergency.

In the embodiments, systems and methods are disclosed for communicating the location of an emergency using a novel unique location code and/or a requested emergency service using a novel unique location code. In some embodiments, the unique codes can be input by the user after entering the phone number of the emergency services (e.g., 911). Then, in some embodiments, the unique codes can be transmitted at the moment the user initiates the emergency call. In some embodiments, the disclosed unique location codes and unique service codes allow for expedited handling of emergency calls by providing PSAP operators with precise location information and/or emergency information at the time the call is received at the PSAP.

In some embodiments, unique location codes and unique service codes can include characters such as numbers, letters, or symbols (e.g., asterisks, "@" symbol, "#" symbol). In some embodiments, the unique location codes and/or unique service codes can include one or more sets of characters. In some embodiments, each set of characters can include one or more characters. In some embodiments, the unique codes can have a predetermined number of sets of characters. In some embodiments, each set of characters can have a predetermined number of characters.

In some embodiments, a unique location code can include one or more sets of characters, each set of characters indicating progressively more precise location information. In some embodiments, the location of the sets of characters within the unique location code correspond to a location precision hierarchy. In those embodiments, a unique location code can include a general location (e.g., a mall, a school campus, apartment complex), a structure within the general location (e.g., a building), and a place within that structure (e.g., store, classroom, apartment). As an example, in some embodiments, an emergency call may include the unique location code "15429" where the first two characters ("15") identify School A and the remaining three characters identify classroom 429 of School A. On the other hand, the unique location code "15365" may identify classroom 365 of School A.

In some embodiments, a unique service code can include one or more sets of characters providing progressively more specific information regarding the nature of the emergency and of the services required. For example, in some embodiments, a first set of characters of a unique service code can identify the type of emergency: 1—Medical; 2—Police; 3—Poisoning; 4—Fire. In some embodiments, the unique service code can include a second set of characters specifying the nature of the emergency.

| First Set of Characters | Second Set of Characters |
|---|---|
| 1 - Medical | 1 - Trauma |
|  | 2 - Heart Attack |
| 2 - Police | 1 - Robbery |
|  | 2 - Active Shooter |
| 3 - Poisoning | 1 - Plant |
|  | 2 - Animal |
| 4 - Fire | 1 - Building |
|  | 2 - Forest |

For example, in an embodiment, inputting the unique service code "22" indicates a request for police response to an active shooter emergency while inputting the unique service code "12" requests medical assistance to treat a heart attack.

In some embodiments, the unique service code and unique location codes may be combined to communicate both the type of service required and the location of the emergency, referred herein as a unique combined code. Following with the examples above, in some embodiments, a user may input the unique combined code "215249" to indicate a request for police presence in classroom 249 of School A. In some embodiments, the unique service code and unique location codes can be arranged in any suitable manner to create the unique combined code.

In some embodiments, the structure of the unique location or service codes or the structure of the unique combined codes can be determined by the specific jurisdiction or geographical area where the PSAP is located. In that sense, each PSAP can have unique codes that represent the specific locations and types of emergencies that may arise within the area covered by the PSAP. In some embodiments, an entity such as a school can coordinate with the corresponding entity offering emergency response services (e.g., local government) to set predetermined unique location and/or service codes that best describe the potential emergency needs of the entity.

In some embodiments, for example, where an emergency call is routed to a PSAP different than the PSAP corresponding to the scene of the emergency, the unique location and/or service codes may be in conflict with the location information corresponding to the mobile device initiating the call. In these embodiments, the PSAP receiving the call can reroute the call to the appropriate PSAP based on the unique location code.

In the various embodiments, systems and methods are disclosed for providing unique codes sent from a UE to the responding PSAP at the onset of an emergency call. In some aspects, the techniques described herein relate to a method including receiving a Session Initiation Protocol (SIP) INVITE message with a modified P-Access-Network-Info (PANI) header, the modified PANI header including a unique code, the SIP INVITE message associated with an emergency call from a user equipment (UE); obtaining, from an Automatic Location Identification (ALI) database, UE location information associated with the UE based on information in the modified PANI header; determining an Emergency Services Routing Key (ESRK) for the emergency call based on the UE location information; storing in a database the ESRK and associated unique code corresponding to the emergency call; receiving, from a Public Safety Answering Point (PSAP), a request to provide the unique codes corresponding to the emergency call, the request including the ESRK; and providing, to the PSAP, the unique codes.

In some aspects, the unique code includes a unique service code corresponding to a service requested in the emergency call. In some aspects, the unique code includes a unique location code corresponding to a location associated with the emergency call.

In some aspects, the unique code can be entered by a user of the UE when initiating the emergency call. In some aspects, the modified PANI header can be generated by the UE.

In some aspects, the method further comprises retrieving from the database the unique code based on the ESRK included in the request by the PSAP.

In some aspects, the SIP INVITE message with a modified PANI header is received at a Location Retrieval Function (LRF) from an Emergency Call Session Control Function (E-CSCF). In some aspects, the modified PANI header can be generated a Proxy-Call Session Control Function (P-CSCF) and sent from the P-CSCF to the E-CSCF as part of the SIP INVITE message.

In some aspects, the techniques described herein relate to a non-transitory computer-readable storage medium for storing instructions executable by a processor, the instructions comprising receiving a Session Initiation Protocol (SIP) INVITE message with a modified P-Access-Network-Info (PANI) header, the modified PANI header including a unique code, the SIP INVITE message associated with an emergency call from a user equipment (UE); obtaining, from an Automatic Location Identification (ALI) database, UE location information associated with the UE based on information in the modified PANI header; determining an Emergency Services Routing Key (ESRK) for the emergency call based on the UE location information; storing in a database the ESRK and associated unique code corresponding to the emergency call; receiving, from a Public Safety Answering Point (PSAP), a request to provide the unique codes corresponding to the emergency call, the request including the ESRK; and providing, to the PSAP, the unique codes.

In some aspects, the techniques described herein relate to a device comprising a processor configured to receive a Session Initiation Protocol (SIP) INVITE message with a modified P-Access-Network-Info (PANI) header, the modified PANI header including a unique code, the SIP INVITE message associated with an emergency call from a user equipment (UE); obtain, from an Automatic Location Identification (ALI) database, UE location information associated with the UE based on information in the modified PANI header; determine an Emergency Services Routing Key (ESRK) for the emergency call based on the UE location information; store in a database the ESRK and associated unique code corresponding to the emergency call; receive, from a Public Safety Answering Point (PSAP), a request to provide the unique codes corresponding to the emergency call, the request including the ESRK; and provide, to the PSAP, the unique codes.

FIG. 1 is a block diagram illustrating an example environment within which the systems and methods disclosed herein could be implemented according to an embodiment.

FIG. 1 shows components of a general environment in which the systems and methods discussed herein may be practiced. Not all the components may be required to practice the disclosure, and variations in the arrangement and type of the components may be made without departing from the spirit or scope of the disclosure. In some embodiments, access network 104, core network 106, and/or emergency network 108 can include a one or more network elements to allow for the efficient routing of emergency calls, messages, or other forms of conveying information (e.g., multimedia) from a device of a user (e.g., user equipment (UE)) to a PSAP. In some embodiments, network elements may be physical elements such as router, servers and switches or may be virtual Network Functions (NFs) implemented on physical elements.

In the illustrated embodiment, a system 100 can include UE 102 communicatively coupled to an emergency network 108 via an access network 104 and a core network 106. In some embodiments, UE 102 can comprise any computing device capable of communicating with the access network 104. In some embodiments, UE 102 can be device 400 as described with respect to FIG. 4. No limit is placed on the type of UE. For example, in some embodiments, UE 102 can be Ultra-Reliable Low Latency Communications (URLLC) devices such as autonomous vehicle computing devices, IoT devices, remote surgery devices, etc. In some embodiments, UE 102 can be enhanced mobile broadband (eMBB) devices such as smartphones, tablets, etc. In some embodiments, UE 102 can be Massive Machine-Type Communications (mMTC) devices such as sensors, meters, and monitoring devices.

In some embodiments, a system 100 can include UE 102 communicatively connected to one or more access points 110 of access network 104. In some embodiments, the access network 104 can comprise a NextGen Radio Access Network (NG-RAN). In an embodiment, access point 110 can comprise one or more gNodeB (gNB) base stations connected to UE 102 via an air interface. In one embodiment, the air interface can comprise a New Radio (NR) air interface. In some embodiments, the gNodeB can include multiple network interfaces for communicating with core network 106 and, specifically, mobility manager 112 and serving gateway 114.

In some embodiments, access point 110 can comprise eNodeB (eNB) base stations connected to UE 102 via an air interface. In some embodiments, the air interface can comprise an E-UTRAN Uu or LTE Uu radio air interface. In these embodiments, the eNodeB can provide all functionality to implement and operate the air interface and negotiates uplinks and downlinks with the UE 102. In some embodiments, the eNodeB can also include multiple network interfaces for communicating with the core network 106 and, specifically, mobility manager 112 and serving gateway 114.

In some embodiments, access point 110 can include both a gNodeB base station and an eNodeB base station. In some embodiments, UE 102 can connect to both a gNodeB base station and an eNodeB base station in a dual connectivity (DC) setup.

According to some embodiments, the access network 104 can provide UE 102 access to a core network 106. In some embodiments, core network 106 provides wireless connectivity to UE 102 via access network 104. In some embodiments, this connectivity can comprise voice and data services.

In some embodiments, core network 106 can include a mobility manager 112 communicatively coupled to a serving gateway 114 and/or a subscriber database 118. In one embodiment, the mobility manager 112 can comprise an Access and Mobility Management Function (AMF) in a 5G network. In one embodiment, the serving gateway 114 can comprise a Session Management Function (SMF) for control data or User Plane Function (UPF) for user data. In one embodiment, the mobility manager 112 can comprise a Mobile Management Entity (MME) in a 4G network.

In some embodiments, the mobility manager 112 manages control plane traffic while the gateway elements—serving gateway 114 and/or packet gateway 116—manage user data traffic. In some embodiments, the mobility manager 112 can comprise hardware or software for handling network attachment requests from UE 102. As part of processing these requests, in some embodiments, the mobility manager 112 can access the subscriber database 118. In some embodiments, subscriber database 118 can comprise hardware or software that stores user authorization and authentication data and validates users to the network. In some embodiments, the subscriber database 118 can comprise a Unified Data Management (UDM) and Unified Data Repository (UDR) in a 5G network. In some embodiments, the subscriber database 118 can comprise an Home Subscriber Server (HSS) in a 4G network.

In some embodiments, the subscriber database 118 can also store a location of the user updated via a Diameter Protocol or similar protocol. In some embodiments, the Diameter protocol is a networking protocol that is used for authentication, authorization, and accounting (AAA) in mobile networks. In some embodiments, the Diameter protocol can be used to communicate information about a UE's location to other elements of the network, such as the core network 106 or a location server. In some embodiments, this information can include the device's GPS coordinates, as well as other data such as cell tower or Wi-Fi access point (e.g., access points 110) information that can be used to determine its location.

In some embodiments, the mobility manager 112 can also be configured to create data sessions or bearers between UE 102 and serving gateway 114 or packet gateway 116. In one embodiment, the gateways 114 and/or 116 may comprise single or separate devices. In general, the serving gateway 114 can route and forward user data packets while also acting as the mobility anchor for the user plane during access point handovers and as the anchor for mobility between different network technologies. In some embodiments, for UEs entering idle state, the serving gateway 114 can terminate the downlink data path and trigger paging when downlink data arrives for the UE 102. In some embodiments, serving gateway 114 can manage and store UE 102 contexts, e.g., parameters of the IP bearer service, network internal routing information. In some embodiments, in a 5G network, the serving gateway 114 can be implemented by an SMF. In some embodiments, in a 4G network, the serving gateway 114 can be implemented by an S-GW.

In some embodiments, serving gateway 114 can be communicatively coupled to the packet gateway 116. In some embodiments, the packet gateway 116 can provide connectivity from the UE 102 to external Packet Data Networks (PDNs) such as emergency network 108 by being the point of exit and entry of traffic to external networks (e.g., emergency network 108). In some embodiments, UE 102 can have simultaneous connectivity with plurality gateways, including packet gateway 116 for accessing multiple packet data networks. In some embodiments, packet gateway 116 can perform policy enforcement, packet filtering for each user, charging support, lawful interception, and packet screening. In some embodiments, in a 5G network, the packet gateway 116 can be implemented by a UPF. In some embodiments, in a 4G network, the packet gateway 116 can be implemented by a P-GW.

According to some embodiments, UE 102 can be communicatively coupled to emergency network 108 via access network 104 and core network 106. In some embodiments, emergency network 108 can be referred to as an Emergency Service Network (ESN). In some embodiments, emergency network 108 can allow for the routing of an emergency call from UE 102 to a PSAP (e.g., PSAP_x 136 or PSAP_y 138). As noted elsewhere, the term emergency call refers to any type of emergency communications such as voice, text (e.g., instant messages (IMs), Short Message Service (SMS) messages, or other types of text messages), multimedia (e.g., images, video, and audio recordings), or any other type of data that may be used to convey information during an emergency.

In some embodiments, emergency network 108 can be an Internet Protocol Multimedia Subsystem (IMS) network. In some embodiments, an IMS network can allow for the integration of various communication technologies, such as voice, video, and data, into a single network to provide communication services such as voice over IP (VOIP), video conferencing, and multimedia messaging. In some embodiments, emergency network 108 can include or be communicatively coupled to a traditional Public Switched Telephone Network (PSTN). In some embodiments, network elements of an IMS network can be communicatively coupled to the PTSN through an emergency gateway or a Media Gateway Control Function (MGCF) (e.g., Gateway/MGCF 134).

In some embodiments, emergency network 108 can include a Proxy-Call Session Control Function (P-CSCF) 120, an Emergency Call Session Control Function (E-CSCF) 122, a location function 124, an emergency gateway or MGCF 134, and one or more PSAPs (PSAP_x 136, PSAP_y 138). In some embodiments, emergency call from UE 102 can be routed from the access network 104 to core network 106. In some embodiments, packet gateway 116 of core network 106 can communicate with P-CSCF 120 to route the emergency call from the UE 102 to the emergency network 108.

In some embodiments, P-CSCF 120 acts as a proxy for Session Initiation Protocol (SIP) signaling between UE 102 and other network elements. In some embodiments, SIP signaling is a signaling protocol that allows for initiating, maintaining, modifying, and terminating real-time communications sessions that involve video, voice, messaging, and other communications between two or more endpoints on IP networks. In some embodiments, SIP can be a text-based protocol that functions by sending messages, called SIP requests and responses, between endpoints.

As discussed in further detail herein, in some embodiments, SIP requests can include an SIP INVITE message. In some embodiments, an SIP INVITE message refers to a message sent by the calling party (e.g., UE 102) to establish a session with the recipient (e.g., elements of emergency network 108. In some embodiments, an SIP INVITE message can include a plurality of headers including a Request Uniform Resource Identifier (URI) header and a P-Access-Network-Info (PANI) header. In some embodiments, the Request URI header can identify the intended recipient of the emergency call. In some embodiments, the Request URI header can include the dial string entered by the user at the time of placing an emergency. In those embodiments, the dial string can include the phone number of the intended recipient as well as any unique codes entered by the user. In some embodiments, the PANI header can include information regarding the access network (e.g., access network 104) to which the UE is connected as well as cell tower or base station information (e.g., cell ID).

Returning to FIG. 1, according to some embodiments, P-CSCF 120 can then route the emergency call to the E-CSCF 122. In some embodiments, E-CSCF 122 can communicate with location function 124 to obtain or otherwise determine an Emergency Services Routing Key (ESRK) for the emergency call. In some embodiments, an ESRK can be a unique identifier that identifies the emergency call. In some embodiments, the ESRK can be associated with a specific geographical location. In some embodiments, specific PSAPs are responsible for providing emergency services to specific ESRKs.

In some embodiments, location function 124 can include a Location Retrieval Function (LRF) 126 and an Automatic Location Identification (ALI) database 128. In some embodiments, LRF 126 can determine the location of UE 102 using one or more localization technologies including GPS, cell or tower identifiers (e.g., received as part of the SIP INVITE message), Wi-Fi-based location, and the like. In some embodiments, the LRF 126 can communicate directly with UE 102 to obtain UE location information. In some embodiments, UE location information can include geographic coordinates (e.g., latitude and longitude), an address, or other localizing information (e.g., cell or tower ID). In some embodiments, the UE location information can be received as part of a SIP INVITE messages including modified P-Access-Network-Info (PANI) headers, as discussed elsewhere herein.

In some embodiments, LRF 126 can communicate with ALI database 128 to obtain UE location information or other information regarding the UE or the user. In some embodiments, ALI database 128 can include UE location information including the carrier name, carrier ID, callback numbers, routing numbers, and/or cell site/sector information. In some embodiments, the LRF 126 can use the UE location information to determine or otherwise allocate an ESRK for the emergency call. In some embodiments, LRF 126 can maintain a database of ESRKs corresponding to specific geographic locations. In some embodiments, to determine an ESRK for an emergency call, the LRF 126 can select from available ESRKs corresponding to the geographic location matching the location of the UE (e.g., contained in the UE location information) an ESRK and allocate it to the emergency call. In some embodiments, LRF 126 can then store or otherwise log the ESRK and all the information associated with the emergency call including UE location information and any other UE or user information in an internal database or in the ALI database 128. In some embodiments, the LRF 126 can also store the unique codes, described elsewhere herein, associated with the emergency call in the internal database, the ALI database 128, or some other database. In some embodiments, the LRF 126 can provide the ESRK to the E-CSCF 122.

In some embodiments, the location function 124 can include a Gateway Mobile Location Center (GMLC) 132 and/or an Emergency Services Mobile Location Center (E-SMLC) (not shown). In those embodiments, the GMLC can determine UE location information and from the UE location information determine an appropriate ESRK.

As will be discussed in relation to FIG. 2, according to some embodiments, the disclosed P-CSCF 120 and/or E-CSCF 122 can include additional novel functionality over traditional P-CSCFs/E-CSCFs to analyze SIP INVITE messages including modified PANI headers. In some embodiments, the P-CSCF 120 can extract unique codes from one header in a SIP INVITE message and modify another header in the SIP INVITE message to include the unique codes. For example, in some embodiments, the P-CSCF 120 can analyze a Request URI in the SIP INVITE message to extract the unique codes and modify the PANI header to append or otherwise add the unique codes to the PANI header. In some embodiments, the P-CSCF can extract the unique codes from the Request URI header by parsing the dialed number including the unique codes and any special characters and extracting the unique codes. In some embodiments, the SIP INVITE may already have PANI header modified by the UE when received at the P-CSCF 120 In some embodiments, the E-CSCF 122 can analyze modified PANI headers to identify unique service codes, unique location codes, or unique combined codes, as described herein.

In some embodiments, E-CSCF 122 can communicate with location function 124 to obtain an Emergency Services Routing Key (ESRK) based at least in part on the unique location code included in the modified PANI header. In some embodiments, one or more network elements of access network 104 and/or core network 106 can include additional functionality to handle modified PANI headers. For example, in some embodiments, the network elements of access network 104, core network 106, and emergency network 108 may be updated to interpret PANI headers with additional parameters (e.g., unique codes) not included in traditional PANI headers.

Returning to FIG. 1, in some embodiments, the location function 124 can also include a Service Routing (SR) database 130. In some embodiments, SR database 130 can include routing information for emergency calls including the appropriate network element to route the call to, the type of call (emergency or non-emergency), and the service level (normal or priority) requested for the call.

In some embodiments, E-CSCF 122 can communicates with Gateway/MGCF 134 to route the emergency call to the correct PSAP associated with the ESRK determined by the E-CSCF 122. In some embodiments, E-CSCF 122 and/or Gateway/MGCF 134 can communicate with SR database 130 to determine the appropriate routing for the emergency call. In some embodiments, after the emergency call is routed to the correct PSAP the emergency call is established.

In some embodiments, after the emergency call is established with the corresponding PSAP, the PSAP can query location function 124 to obtain the UE location information directly. For example, in some embodiments, the PSAP can query LRF 126 to provide UE location information. In some embodiments, a PSAP operator can use the UE location information to direct first responders to the scene of the emergency.

As noted herein, in some embodiments where traditional location methods are used, the PSAP corresponding to the determined ESRK may not be the correct PSAP because of emergency circumstances, environmental conditions or technical limitations. For example, in some embodiments, the determined PSAP may be PSAP_x 136. However, UE 102 may actually be within the geographical location of PSAP_y 138. In those embodiments, the operator of PSAP_x 136 can reroute the emergency call to PSAP_y 138 based on unique codes received from the UE. In some of those embodiments, PSAP_x 136 may query Gateway/MGCF 134 and E-CSCF 122 to reroute the call to PSAP_y 138.

Figure 2:
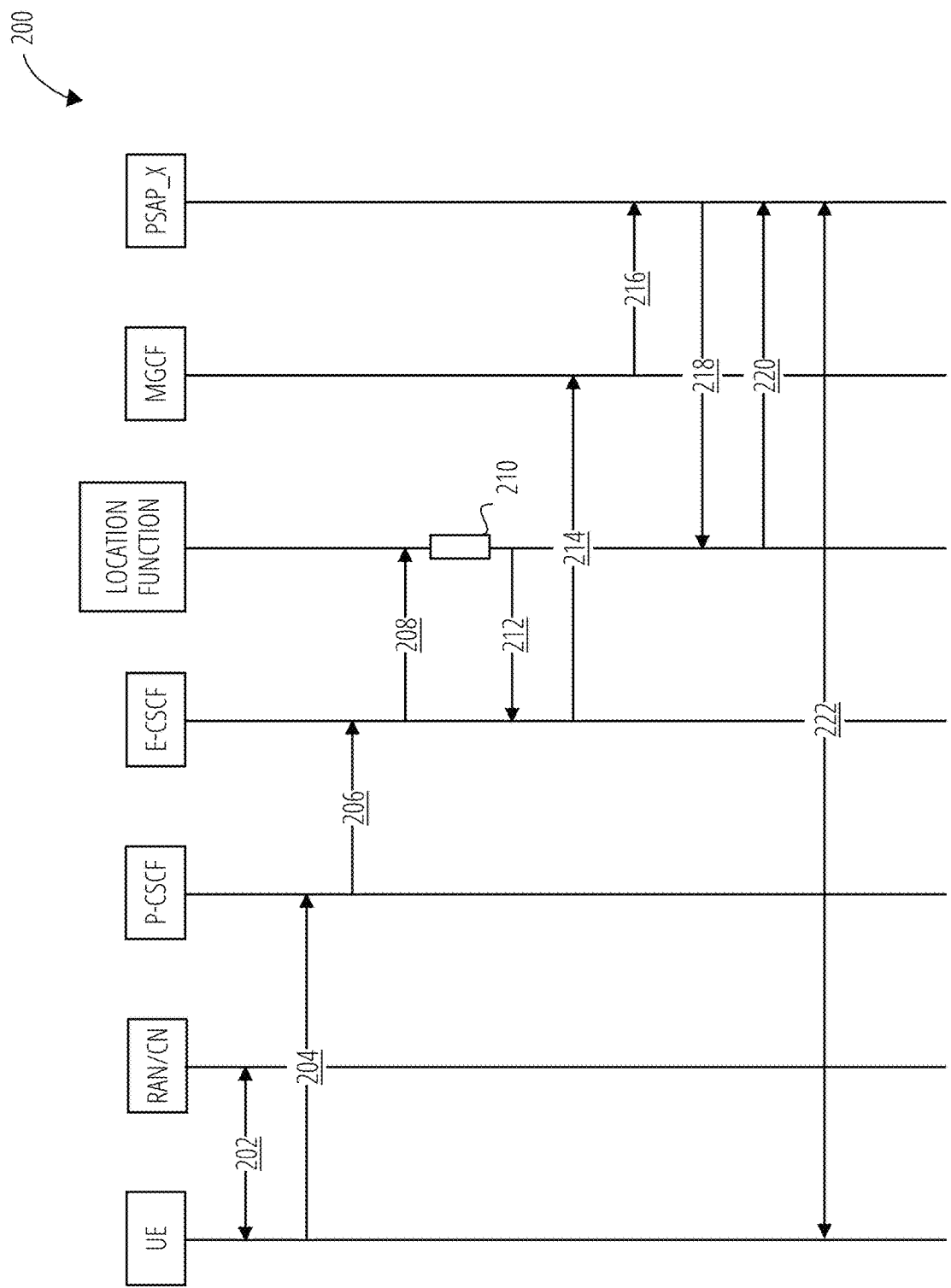
FIG. 2 is a call flow diagram illustrating a method for establishing an emergency call including unique codes according to an embodiment.

FIG. 2 is a call flow diagram illustrating a method for establishing an emergency call including unique codes according to an embodiment.

In Step 202, method 200 can include a UE (e.g., UE 102) initiating an emergency call. In some embodiments, the emergency call is initiated by a user of the UE dialing an emergency phone number (e.g., 911). In some embodiments, during Step 202, the UE interacts with the several network elements and/or NFs of a RAN and/or a core network to establish an emergency call session. In some embodiments, establishing an emergency call session can include transmitting by the UE an attach or PDN connectivity request for emergency bearer services; establishing default and signaling bearers with emergency Quality of Service (QOS) and registering the emergency on UE. In some embodiments, during dialing of the emergency number the user can also input additional parameters. In some embodiments, the additional parameters can be a unique service code, a unique combined code, or a combination thereof (e.g., a unique combined code). In some embodiments, after Step 202 a communication session is established between the UE and the emergency network (e.g., emergency network 108).

In Step 204, method 200 can include the UE transmitting to a P-CSCF (e.g. P-CSCF 120) of the emergency network an SIP INVITE message. In some embodiments, the SIP INVITE can include Request URI header and/or a PANI header.

As noted above, in some embodiments, the UE can include any additional parameters (e.g., unique service codes/unique location codes) entered by the user as part of the Request URI header. In some embodiments, the UE can include the additional parameters as part of a modified PANI header. For example, in some embodiments, a user may dial the emergency number ("911") followed by an asterisk ("*") and a unique code ("2765"). In those embodiments, the UE can generate a Request URI or PANI header including the unique code 2765. In those embodiments, the unique code is denoted by the asterisk. In some embodiments, the asterisk can indicate to a P-CSCF receiving the SIP INVITE message and/or to the UE the beginning of the unique code string. In some embodiments, other characters can be used to denote the start of the unique code string. In some embodiments, different characters may be reserved as part of the different communications protocols. In those embodiments, a suitable character may be selected to the denote the beginning of the additional parameters.

In some embodiments, the PANI header can be a header string and the additional parameters can added to the string. For example, in some embodiments, a typical complete PANI header can be: [P-Access-Network-Info: 3GPP-E-UTRAN-FDD; utran-cell-id-3gpp=1234567a0000cb123], while a modified PANI header with the additional parameter can be: [P-Access-Network-Info: 3GPP-E-UTRAN-FDD; utran-cell-id-3gpp=1234567a0000cb123; 2765].

In some embodiments, in Step 204, method 200 can include the P-CSCF analyzing the Request URI header of the SIP INVITE message to extract any unique codes entered by the user at the time the emergency called is placed. Then, in some embodiments, the P-CSCF can modify the PANI header included in the SIP INVITE message to include the unique codes extracted from the Request URI header. In some embodiments, the result of Step 204 is an SIP INVITE message with a modified PANI header including unique codes entered by a user.

In Step 206, method 200 can include the P-CSCF forwarding the SIP INVITE message with the modified PANI header to an E-CSCF (e.g., E-CSCF 122). In turn, in Step 208, method 200 can include forwarding the SIP INVITE message from the E-CSCF to a location function (e.g., LRF 126) to obtain or otherwise determine an ESRK for the emergency call. In some embodiments, in Step 208, method 200 can include performing Operation 210 to determine the ESRK from the location information. In some embodiments, Operation 210 can include an LRF (e.g., LRF 126) communicating with an ALI database (e.g., ALI database 128) to obtain UE location information and determine an ESRK for the emergency call based on the UE location information.

In some embodiments, the disclosed E-CSCF can include additional functionality to parse the modified PANI header in the INVITE to identify any unique codes included in the header. In some embodiments, the disclosed E-CSCF can analyze the modified PANI header to identify the additional parameters or unique codes. In some embodiments, during Operation 210, the unique codes in the PANI header can be associated with the ESRK in either the ALI database or some other database.

In Step 212, method 200 can include transmitting the ESRK from the location function to the E-CSCF. In some embodiments, the response from the location function to the E-CSCF can be an SIP 300 Redirect Response. In some embodiments, in Step 212, the E-CSCF can also receive from the location function the PSAP associated with the ESRK.

In Step 214, method 200 can include transmitting the SIP INVITE message from the E-CSCF to an MGCF (e.g., Gateway/MGCF 134) to route the SIP INVITE message (including the modified PANI header) to the appropriate PSAP. In Step 216, method 200 can include sending an IAM (Initial Address Message) to the PSAP to establish the emergency call.

Optionally, in Step 218, method 200 can include transmitting a request from the PSAP to the location function to provide UE location information and/or the unique codes associated with the ESRK. And, in Step 220, method 200 can include receiving at the PSAP the UE location information and/or the unique codes from the location function.

In Step 222, method 200 can include establishing the emergency call between the UE and the appropriate PSAP.

Figure 3:
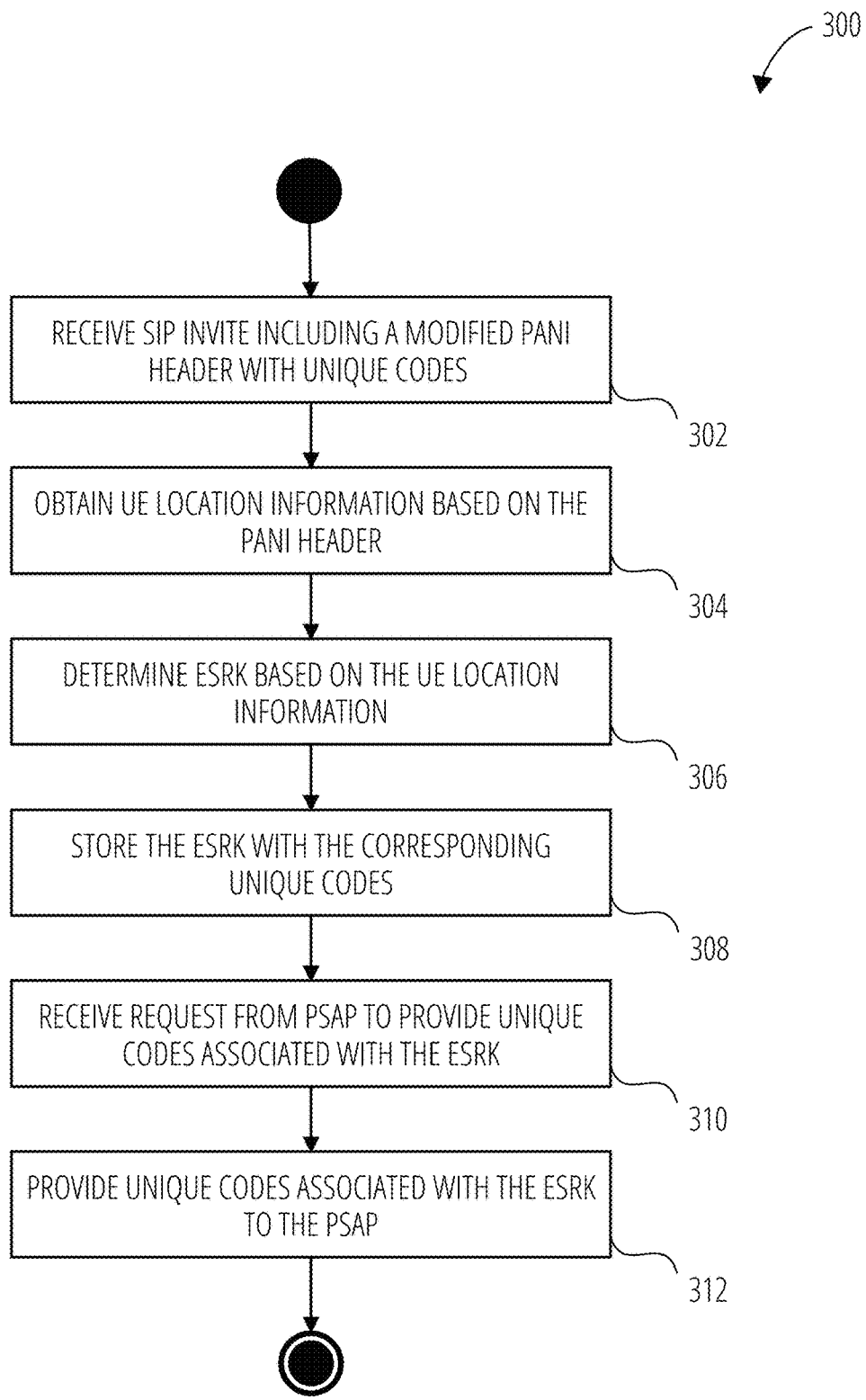
FIG. 3 is a flow diagram illustrating a method for managing unique codes according to an embodiment.

FIG. 3 is a flow diagram illustrating a method for managing unique codes according to an embodiment.

In Step 302, method 300 can include receiving an SIP INVITE message including a modified PANI header with unique codes. In some embodiments, the SIP INVITE can be received at an LRF (e.g., LRF 126) from an E-CSCF (e.g., E-CSCF 122). In some embodiments, the unique codes can include a unique service code, a unique location code, or a unique combined code comprising both unique service codes and unique location codes. In some embodiments, unique codes can be entered by the user of the UE when dialing the emergency number at the outset of an emergency call. In some embodiments, the modified PANI header can be generated by a P-CSCF by extracting any unique codes from other SIP INVITE message headers and modifying the PANI header to include the extracted unique codes. In some embodiments, the modified PANI header can be generated by the UE. In some embodiments, the PANI header can include a cell or tower ID corresponding to the cell or tower communicatively coupled to the UE and through which the UE transmits the SIP INVITE message.

In Step 304, method 300 can include obtaining UE location information based on the PANI header. In some embodiments, the LRF communicates with an ALI database (e.g., ALI database 128) to obtain the UE location information. In some embodiments, the ALI database identifies the UE location information based on the cell or tower ID in the PANI header.

In Step 306, method 300 can include determining an ESRK based on the UE location information. In some embodiments, the ESRK is determined by the LRF. In some embodiments, the LRF selects an ESRK from a pool of available ESRKs corresponding to the geographical location covering the UE location identified in the UE location information. In some embodiments, the determined ESRK is unique to the emergency call and can identify the emergency call across network elements for the duration of the call. In some embodiments, after the emergency call is terminated the determined ESRK is released back into the pool of available ESRKs for the given geographic area.

In Step 308, method 300 can include storing or otherwise associating the determined ESRK with the unique codes. In some embodiments, the LRF can store the ESRK and associated unique codes in an internal database. In some embodiments, the ESRK and associated unique codes can be stored in the ALI database, an SR database, or some other database.

Optionally, after Step 308, method 300 can include providing the ESRK to the E-CSCF. In turn, in some embodiments, the E-CSCF can use the provided ESRK to route the emergency call to the appropriate PSAP covering the ESRK through an emergency gateway/MGCF.

In Step 310, method 300 can include receiving request from appropriate PSAP to provide unique codes associated with the ESRK. In some embodiments, the request from the PSAP can include the ESRK corresponding to the emergency call. In some embodiments, the request from the PSAP can be received by the LRF. In turn, the LRF can retrieve the unique codes associated with the ESRK either from the internal database, the ALI database, the SR database, or some other database.

In Step 312, method 300 can include providing the unique codes to the PSAP. In some embodiments, the unique codes can be provided by the LRF to the PSAP.

Figure 4:
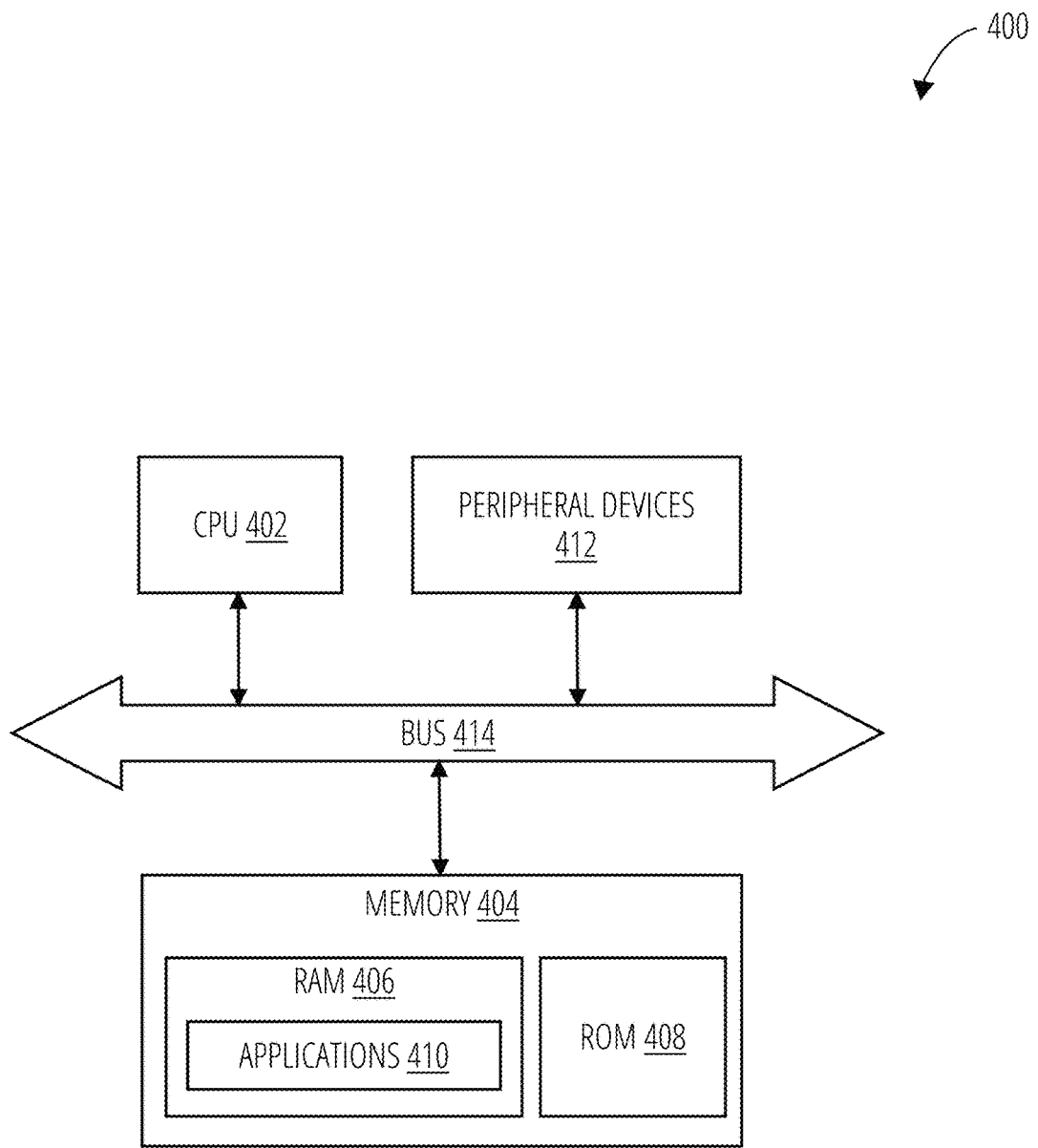
FIG. 4 is a block diagram of a device according to some embodiments.

FIG. 4 is a block diagram of a device according to some embodiments.

As illustrated, the device 400 can include a processor or central processing unit (CPU) such as CPU 402 in communication with a memory 404 via a bus 414. Device 400 can also include one or more input/output (I/O) or peripheral devices 412. Examples of peripheral devices include, but are not limited to, network interfaces, audio interfaces, display devices, keypads, mice, keyboard, touch screens, illuminators, haptic interfaces, global positioning system (GPS) receivers, cameras, or other optical, thermal, or electromagnetic sensors.

In some embodiments, the CPU 402 can comprise a general-purpose CPU. The CPU 402 can comprise a single-core or multiple-core CPU. The CPU 402 can comprise a system-on-a-chip (SoC) or a similar embedded system. In some embodiments, a graphics processing unit (GPU) can be used in place of, or in combination with, a CPU 402. Memory 404 can comprise a non-transitory memory system including a dynamic random-access memory (DRAM), static random-access memory (SRAM), Flash (e.g., NAND Flash), or combinations thereof. In one embodiment, the bus 414 can comprise a Peripheral Component Interconnect Express (PCIe) bus. In some embodiments, bus 414 can comprise multiple busses instead of a single bus.

Memory 404 illustrates an example of non-transitory computer storage media for the storage of information such as computer-readable instructions, data structures, program modules, or other data. Memory 404 can store a basic input/output system (BIOS) in read-only memory (ROM), such as ROM 408, for controlling the low-level operation of the device. The memory can also store an operating system in random-access memory (RAM) for controlling the operation of the device Applications 410 can include computer-executable instructions which, when executed by the device, perform any of the methods (or portions of the methods) described previously in the description of the preceding Figures. In some embodiments, the software or programs implementing the method embodiments can be read from a hard disk drive (not illustrated) and temporarily stored in RAM 406 by CPU 402. CPU 402 may then read the software or data from RAM 406, process them, and store them in RAM 406 again.

The device 400 can optionally communicate with a base station (not shown) or directly with another computing device. One or more network interfaces in peripheral devices 412 are sometimes referred to as a transceiver, transceiving device, or network interface card (NIC).

An audio interface in Peripheral devices 412 produces and receives audio signals such as the sound of a human voice. For example, an audio interface may be coupled to a speaker and microphone (not shown) to enable telecommunication with others or generate an audio acknowledgment for some action. Displays in Peripheral devices 412 may comprise liquid crystal display (LCD), gas plasma, light-emitting diode (LED), or any other type of display device used with a computing device. A display may also include a touch-sensitive screen arranged to receive input from an object such as a stylus or a digit from a human hand.

A keypad in peripheral devices 412 can comprise any input device arranged to receive input from a user. An illuminator in peripheral devices 412 can provide a status indication or provide light. The device can also comprise an input/output interface in peripheral devices 412 for communication with external devices, using communication technologies, such as USB, infrared, Bluetooth™, or the like. A haptic interface in peripheral devices 412 can provide a tactile feedback to a user of the client device.

A GPS receiver in peripheral devices 412 can determine the physical coordinates of the device on the surface of the Earth, which typically outputs a location as latitude and longitude values. A GPS receiver can also employ other geo-positioning mechanisms, including, but not limited to, triangulation, assisted GPS (AGPS), E-OTD, CI, SAI, ETA, BSS, or the like, to further determine the physical location of the device on the surface of the Earth. In one embodiment, however, the device may communicate through other components, providing other information that may be employed to determine the physical location of the device, including, for example, a media access control (MAC) address, Internet Protocol (IP) address, or the like.

The device can include more or fewer components than those shown in FIG. 4, depending on the deployment or usage of the device. For example, a server computing device, such as a rack-mounted server, may not include audio interfaces, displays, keypads, illuminators, haptic interfaces, Global Positioning System (GPS) receivers, or cameras/sensors. Some devices may include additional components not shown, such as graphics processing unit (GPU) devices, cryptographic co-processors, artificial intelligence (AI) accelerators, or other peripheral devices.

The subject matter disclosed above may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, the subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in an embodiment" as used herein does not necessarily refer to the same embodiment, and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms such as "and," "or," or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, can be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, application-specific integrated circuit (ASIC), or other programmable data processing apparatus, such that the instructions, which execute via the processor of the computer or other programmable data processing apparatus, implement the functions/acts specified in the block diagrams or operational block or blocks. In some alternate implementations, the functions or acts noted in the blocks can occur out of the order noted in the operational illustrations. For example, two blocks shown in succession can, in fact, be executed substantially concurrently, or the blocks can sometimes be executed in the reverse order, depending upon the functionality or acts involved.

These computer program instructions can be provided to a processor of a general-purpose computer to alter its function to a special purpose; a special purpose computer; ASIC; or other programmable digital data processing apparatus, such that the instructions, which execute via the processor of the computer or other programmable data processing apparatus, implement the functions or acts specified in the block diagrams or operational block or blocks, thereby transforming their functionality in accordance with embodiments herein.

For the purposes of this disclosure, a computer-readable medium (or computer-readable storage medium) stores computer data, which data can include computer program code or instructions that are executable by a computer, in machine-readable form. By way of example, and not limitation, a computer-readable medium may comprise computer-readable storage media for tangible or fixed storage of data or communication media for transient interpretation of code-containing signals. Computer-readable storage media, as used herein, refers to physical or tangible storage (as opposed to signals) and includes without limitation volatile and non-volatile, removable, and non-removable media implemented in any method or technology for the tangible storage of information such as computer-readable instructions, data structures, program modules or other data. Computer-readable storage media includes, but is not limited to, RAM, ROM, EPROM, EEPROM, flash memory or other solid-state memory technology, CD-ROM, DVD, or other optical storage, magnetic cassettes, magnetic tape, magnetic disk storage, or other magnetic storage devices, or any other physical or material medium which can be used to tangibly store the desired information or data or instructions and which can be accessed by a computer or processor.

For the purposes of this disclosure, a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer-readable medium for execution by a processor. Modules may be integral to one or more servers or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than or more than all the features described herein are possible.

Functionality may also be, in whole or in part, distributed among multiple components, in manners now known or to become known. Thus, a myriad of software, hardware, and firmware combinations are possible in achieving the functions, features, interfaces, and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example to provide a complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
receiving a Session Initiation Protocol (SIP) INVITE message with a modified P-Access-Network-Info (PANI) header, the modified PANI header including a unique code, wherein the SIP INVITE message is associated with an emergency call from a user equipment (UE);
obtaining, from an Automatic Location Identification (ALI) database, UE location information associated with the UE based on information in the modified PANI header;
determining an Emergency Services Routing Key (ESRK) for the emergency call based on the UE location information;
storing, in a database, the ESRK with the unique code corresponding to the emergency call;
receiving, from a Public Safety Answering Point (PSAP), a request to provide the unique code corresponding to the emergency call, the request including the ESRK; and
providing, to the PSAP, the unique codes.

2. The method of claim 1, wherein the unique code includes a unique service code corresponding to a service requested in the emergency call.

3. The method of claim 1, wherein the unique code includes a unique location code corresponding to a location associated with the emergency call.

4. The method of claim 1, wherein the unique code is entered by a user of the UE when initiating the emergency call.

5. The method of claim 1, further comprising retrieving from the database the unique code based on the ESRK included in the request by the PSAP.

6. The method of claim 1, wherein the SIP INVITE request with a modified PANI header is received at a Location Retrieval Function (LRF) from an Emergency Call Session Control Function (E-CSCF).

7. The method of claim 6, wherein the modified PANI header is generated by a Proxy-Call Session Control Function (P-CSCF) and sent from the P-CSCF to the E-CSCF as part of the SIP INVITE message.

8. A non-transitory computer-readable storage medium for storing instructions executable by a processor, the instructions comprising:
receiving a Session Initiation Protocol (SIP) INVITE message with a modified P-Access-Network-Info (PANI) header, the modified PANI header including a unique code, wherein the SIP INVITE message is associated with an emergency call from a user equipment (UE);
obtaining, from an Automatic Location Identification (ALI) database, UE location information associated with the UE based on information in the modified PANI header;

determining an Emergency Services Routing Key (ESRK) for the emergency call based on the UE location information;

storing, in a database, the ESRK with the unique code corresponding to the emergency call;

receiving, from a Public Safety Answering Point (PSAP), a request to provide the unique code corresponding to the emergency call, the request including the ESRK; and providing, to the PSAP, the unique codes.

9. The non-transitory computer-readable storage medium of claim 8, wherein the unique code includes a unique service code corresponding to a service requested in the emergency call.

10. The non-transitory computer-readable storage medium of claim 8, wherein the unique code includes a unique location code corresponding to a location associated with the emergency call.

11. The non-transitory computer-readable storage medium of claim 8, wherein the unique code is entered by a user of the UE when initiating the emergency call.

12. The non-transitory computer-readable storage medium of claim 8, wherein the instructions further comprise retrieving from the database the unique code based on the ESRK included in the request by the PSAP.

13. The non-transitory computer-readable storage medium of claim 8, wherein the modified PANI header is generated by a Proxy-Call Session Control Function (P-CSCF).

14. A device comprising a processor configured to:

receive a Session Initiation Protocol (SIP) INVITE message with a modified P-Access-Network-Info (PANI) header, the modified PANI header including a unique code, wherein the SIP INVITE message is associated with an emergency call from a user equipment (UE);

obtain, from an Automatic Location Identification (ALI) database, UE location information associated with the UE based on information in the modified PANI header;

determine an Emergency Services Routing Key (ESRK) for the emergency call based on the UE location information;

store, in a database, the ESRK with the unique code corresponding to the emergency call;

receive, from a Public Safety Answering Point (PSAP), a request to provide the unique code corresponding to the emergency call, the request including the ESRK; and provide, to the PSAP, the unique codes.

15. The device of claim 14, wherein the unique code includes a unique service code corresponding to a service requested in the emergency call.

16. The device of claim 14, wherein the unique code includes a unique location code corresponding to a location associated with the emergency call.

17. The device of claim 14, wherein the unique code is entered by a user of the UE when initiating the emergency call.

18. The device of claim 14, wherein the processor is further configured to retrieve from the database the unique code based on the ESRK included in the request by the PSAP.

19. The device of claim 14, wherein the processor is further configured to implement a Location Retrieval Function (LRF) and an Emergency Call Session Control Function (E-CSCF) and wherein the SIP INVITE message with a modified PANI header is received at the LRF from the E-CSCF.

20. The device of claim 19, wherein the processor is further configured to implement a Proxy-Call Session Control Function (P-CSCF) and wherein the modified PANI header is generated by the P-CSCF and sent from the P-CSCF to the E-CSCF as part of the SIP INVITE message.

\* \* \* \* \*